(12) United States Patent
Ebina

(10) Patent No.: US 11,110,735 B2
(45) Date of Patent: Sep. 7, 2021

(54) OPTICAL STRUCTURE

(71) Applicant: TOPPAN PRINTING CO., LTD., Tokyo (JP)

(72) Inventor: Kazuyoshi Ebina, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 4 days.

(21) Appl. No.: 16/728,592

(22) Filed: Dec. 27, 2019

(65) Prior Publication Data

US 2020/0139745 A1    May 7, 2020

Related U.S. Application Data

(63) Continuation of application No. PCT/JP2018/024946, filed on Jun. 29, 2018.

(30) Foreign Application Priority Data

Jun. 30, 2017   (JP) .............................. JP2017-128776

(51) Int. Cl.
*B42D 25/425* (2014.01)
*B42D 25/328* (2014.01)
(Continued)

(52) U.S. Cl.
CPC ......... *B42D 25/425* (2014.10); *B42D 25/328* (2014.10); *G02B 5/08* (2013.01); *G02B 5/1842* (2013.01)

(58) Field of Classification Search
CPC ...... B42D 25/425; B42D 25/328; G02B 5/08; G02B 5/1842; G02B 5/1861; G02B 5/1819; G02B 5/1814; G02B 5/18
(Continued)

(56) References Cited

U.S. PATENT DOCUMENTS

2005/0128590 A1    6/2005  Schilling et al.
2006/0056065 A1    3/2006  Schilling et al.
(Continued)

FOREIGN PATENT DOCUMENTS

EP    3 000 613 A1    3/2016
JP    H07-64024 A     3/1995
(Continued)

OTHER PUBLICATIONS

International Searching Authority, "International Search Report," issued in connection with International Patent Application No. PCT/JP2018/024946, dated Sep. 25, 2018.
(Continued)

*Primary Examiner* — Justin V Lewis
(74) *Attorney, Agent, or Firm* — Foley & Lardner LLP

(57) ABSTRACT

An optical structure comprises an embossed layer having an embossed face including a recording area, the recording area including an embossed recording body having an uneven structure; and a light reflecting layer covering a part or the entirety of the recording area. The recording area includes a refractive mirror area and a diffractive area in the vicinity of the refractive mirror area. The refractive mirror area includes a plurality of aligned inclined mirrors constituting the embossed recording body, and the diffractive area has a diffractive structure. The refractive mirror area has a plurality of local mirror structures, and the diffractive area has a plurality of local diffractive structures. Each pair of the local diffractive structure and the local mirror structure adjacent to the local diffractive structure forms one local structure.

7 Claims, 5 Drawing Sheets

(51) Int. Cl.
*G02B 5/08* (2006.01)
*G02B 5/18* (2006.01)

(58) Field of Classification Search
USPC .................... 283/72, 74, 91, 94, 98, 901
See application file for complete search history.

(56) References Cited

U.S. PATENT DOCUMENTS

| 2009/0162756 | A1  | 6/2009 | Staub et al. |            |
|--------------|-----|--------|--------------|------------|
| 2011/0128600 | A1* | 6/2011 | Tompkin      | G03H 1/0011 |
|              |     |        |              | 359/2      |
| 2016/0161646 | A1  | 6/2016 | Tompkin et al. |          |

FOREIGN PATENT DOCUMENTS

| JP | 2004-184725 A    | 7/2004 |
| JP | 2009-532726 A    | 9/2009 |
| JP | 4611747 B2       | 1/2011 |
| JP | 2012-123102 A    | 6/2012 |
| JP | 5431363 B2       | 3/2014 |
| JP | 2014-071233 A    | 4/2014 |
| WO | WO-2017/138536 A1 | 8/2017 |

OTHER PUBLICATIONS

International Searching Authority, "Written Opinion," issued in connection with International Patent Application No. PCT/JP2018/024946, dated Sep. 25, 2018.
"Prism—Wikipedia", Apr. 1, 2020 (Apr. 1, 2020), XP055697803, Retrieved from the Internet: URL:https://en.wikipedia.org/wiki/Prism [retrieved on May 25, 2020]; p. 1-6.
Extended European Search Report dated Jun. 9, 2020 for corresponding European Patent Application No. 18823666.5.

* cited by examiner

FIG.5
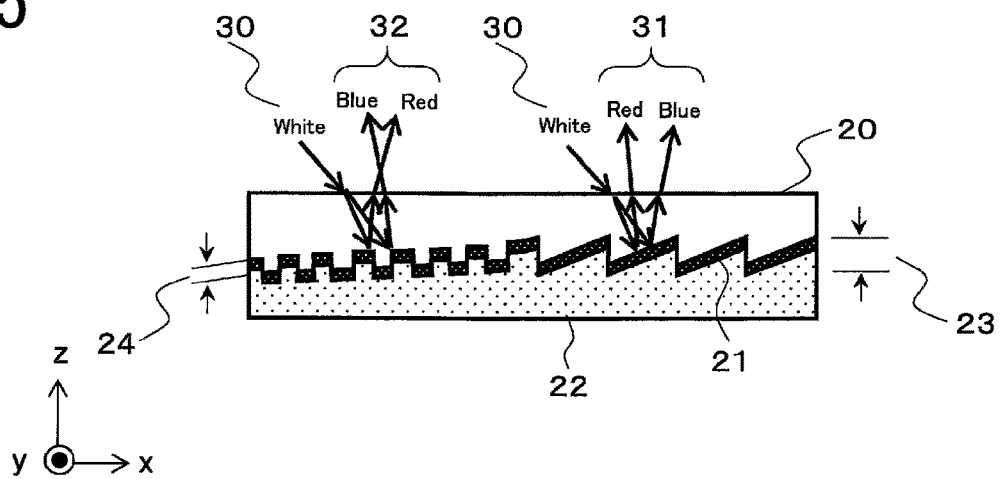
FIG.6
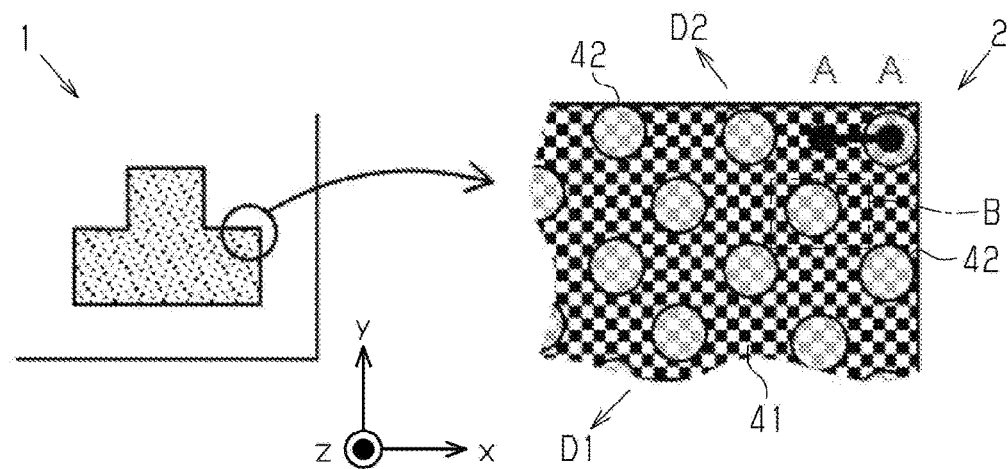
FIG. 7A     FIG. 7B
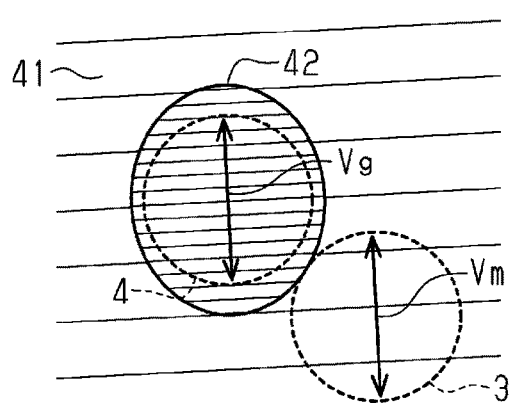     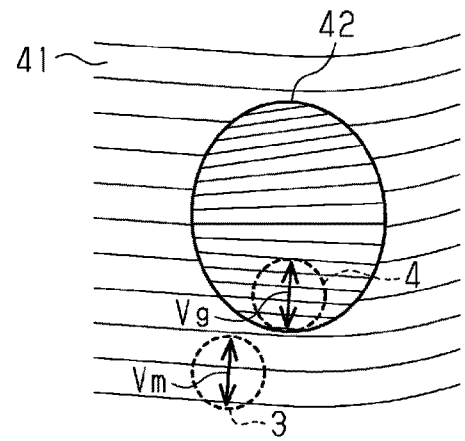

OPTICAL STRUCTURE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2018/024946, filed on Jun. 29, 2018, which is based upon and claims the benefit of priority to Japanese Patent Application No. 2017-128776, filed on Jun. 30, 2017; the disclosures of which are all incorporated herein by reference in their entireties.

TECHNICAL FIELD

The description of embodiments of the present invention relates to an optical structure. The description of embodiments of the present invention also relates to methods such as a manufacturing method, a usage method, or a verification method. In addition, the description of embodiments of the present invention relates to visibility, functionality, applicability, and advantageous effects.

BACKGROUND ART

Security devices used for banknotes, identification (ID), brand protection (BP), etc. must be able to prove or identify that an article of which safety should be secured and to which the security device is attached is authentic. Security devices with decorative properties are also known. An optical structure comprising a hologram and a diffraction grating has been widely used for such security devices.

However, due to demands such as the demand for counteracting improving counterfeit technology and the demand for new decorative effects, there are always needs for an optical structure as a security device. In recent years, as one of the techniques for configuring an optical structure, a technique has been proposed in which a lens structure is formed with submillimeter order minute irregularities, and an embossed recording body is configured by refraction and reflection occurring at the surface of the lens structure.

For example, PTL 1 proposes an optical variable element having at least one free-form surface. According to this optical variable element, an observer can visually recognize three-dimensional letters, numbers, geometric figures, or other objects. The free-form surface of the optical variable element has a lens-like form that produces an enlargement effect, a reduction effect, or a distortion effect.

Further, PTL 2 proposes a diffractive surface relief including a number of continuous elements that follow a first envelope curve. Each element includes an element surface that is substantially parallel to a base surface and side faces that are adjacent to two element surfaces adjacent to each other. The elements have optical intervals of 150 nm to 800 nm. The envelope curve has a spatial frequency of 100 L/mm (lines/mm) to 2000 L/mm (lines/mm) and an optical depth of 450 nm or greater.

[Citation List] [Patent Literature] [PTL 1] JP 4611747 B2; [PTL 2] JP 5431363 B2

SUMMARY OF THE INVENTION

Technical Problem

In order to protect the embossed recording body, the reflecting structure surface formed by a submillimeter-order reflecting structure is positioned so that an observer sees it through a transparent protective layer. When illumination light enters the reflecting structure surface so that the image can be observed, the incident light is refracted at the boundary between the transparent protective layer and the outside of the transparent protective layer. When the light incident on the transparent protective layer is refracted at the boundary, it is affected by the chromatic dispersion of the material constituting the transparent protective layer, that is, the difference in refractive index depending on the wavelength of the light incident on the transparent protective layer. Therefore, the image formed by light emerged from the transparent protective layer would be colored.

When an embossed recording body composed of a reflecting structure or a lens structure in the submillimeter order is to be expressed by an achromatic color, an unintended color would generated in the embossed recording body due to the above-described coloring. As a result, the image quality of the embossed recording body may be deteriorated.

In addition, in the case of combining the diffractive surface relief of PTL 2, that is, an embossed recording body having a submillimeter-order structure, with a diffractive structure serving as a coloring source, the configuration of the diffractive surface relief may be designed solely from the viewpoint of preventing counterfeiting. In this case, the unintended color as described above is not taken into consideration, and as a result, the image quality of the embossed recording body of the diffractive surface relief may be impaired.

There is also a technique in which a diffraction grating or a multilayer film is formed on the surface of a lens structure or the like to generate color by light diffraction or light interference so as to neutralize the unintended color tone. However, if an inclined mirror is used, the angle of emission of the diffracted light does not match with the amount of color shift, in other words, the degree of chromatic dispersion which depends on the angle and wavelength of the reflected light from the inclined mirror. Thus, the desired effect cannot be obtained.

Embodiments of the present invention may be an optical structure capable of compensating for the chromatic dispersion occurring at an inclined mirror.

Means for Solving the Problem

An optical structure for solving the above objective comprises an embossed layer having an embossed face including a recording area, the recording area including an embossed recording body having an uneven structure; and a light reflecting layer covering a part or the entirety of the recording area. The recording area includes a refractive mirror area and a diffractive area in the vicinity of the refractive mirror area. The refractive mirror area includes a plurality of aligned inclined mirrors constituting the embossed recording body, and the diffractive area has a diffractive structure. The refractive mirror area has a plurality of local mirror structures, and the diffractive area has a plurality of local diffractive structures. Each pair of the local diffractive structure and the local mirror structure adjacent to the local diffractive structure forms one local structure, an azimuth direction of a normal vector of the inclined mirror in the local mirror structure and an azimuth direction of a grating vector of the local diffractive structure are similar within the local structure so that the local mirror structure is coupled to the local diffractive structure, the local diffractive structure and the local mirror structure coupled to the local diffractive structure are separated, and diffracted light of the local diffractive structure is mixed with reflected light of the local mirror structure coupled to the local diffractive structure.

In the above-described optical structure, a distance between centers of the local mirror structure and the local diffraction structure may be 10 μm or more and 100 μm or less.

In the above-described optical structure, an angle formed by the azimuth direction of the normal vector of the inclined mirror in the local mirror structure of the local structure and the azimuth direction of the grating vector of the local diffractive structure may be 10° or less.

In the above-described optical structure, each inclined mirror of the local mirror structure may have a depth of 1 μm or more, and the diffractive structure may have a spatial frequency that is higher than 0 and equal to or lower than 114 lines/mm, and a depth of 0.5 μm or less.

In the above-described optical structure, in the recording area, the local mirror structures and the local diffractive structures may be arranged in a checkered pattern.

In the above-described optical structure, the percentage of the area of the local diffractive structure with respect to the area of the local structure may be 50% or less.

In the above-described optical structure, the diffractive area may be a plurality of discrete diffractive areas dispersed in the recording area, and the refractive mirror area may include a region between the discrete diffractive areas.

In the above-described optical structure, the smaller a distance between a diffractive area and an outline of the refractive mirror area, the smaller the area of that diffractive area may be.

In the above-described optical structure, the embossed face may further include a plurality of diffractive areas located outside the refractive mirror area and along the outline of the refractive mirror area.

BRIEF DESCRIPTION OF THE DRAWINGS

FIG. 5 is a schematic view how light beams are reflected and diffracted by the inclined mirrors and the diffraction grating when illumination light enters the optical structure of the present invention.

FIG. 6 is a plan view schematically illustrating the structure of an optical structure according to a second embodiment of the present invention as viewed from the front.

FIGS. 7A and 7B are enlarged plan views schematically showing the structure of the recording area.

DETAILED DESCRIPTION

Figure 1:
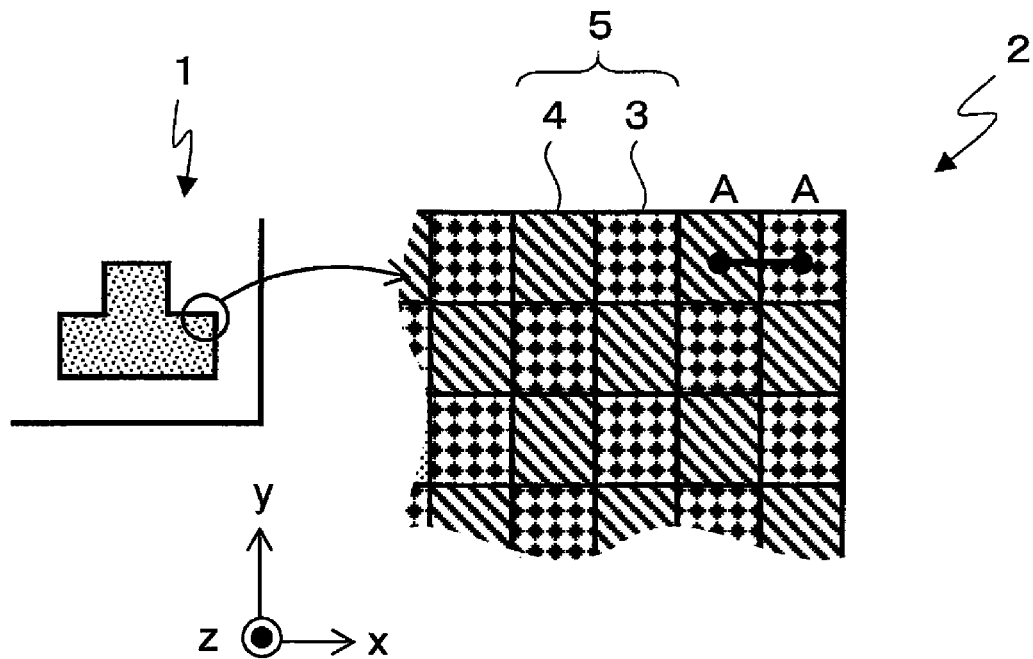
FIG. 1 is a plan view schematically illustrating the structure of an optical structure according to a first embodiment of the present invention as viewed from the front.

With reference to the accompanying Figures, a description will now be given of representative embodiments according to the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. Here, the drawings are schematic, and the relationship between thickness and plane size, the ratio of the thickness of each layer, etc., may be different from actual ones. The embodiments described below are merely examples of the configurations for embodying the technical idea of the present invention, and the technical idea of the present invention should not limit the materials, shapes, structures, and the like of the components to those described below. The technical idea of the present invention can be modified in various ways within the technical scope specified by the claims.

The same constituent elements are denoted by the same reference numerals unless there is a reason for the sake of convenience, and redundant description is omitted. In the drawings referred to in the following description, for clarity, characteristic parts are enlarged, and thus the components are not shown to scale. It is, however, clear that one or more embodiments can be implemented without such details. In addition, known structures and devices may be schematically represented for simplicity.

The optical structure includes an embossed body layer and a light reflecting layer. The embossed layer has an embossed face on one or both faces of the embossed layer. The embossed face includes a recording area where an embossed recording body is recorded. The embossed recording body has an uneven structure. The light reflecting layer covers a part or the entirety of the recording area. The light reflecting layer may also cover a part or the entirety of the embossed face(s). The recording area includes a refractive mirror area and a diffractive area. The refractive mirror area may comprise a plurality of inclined mirrors which are aligned to constitute the embossed recording body, and each inclined mirror may have a depth of 1 μm or more. Each inclined mirror may be inclined at an angle of 1° or more and 45° or less with respect to a base plane that approximates the embossed face. The diffractive area has a diffractive grating. The diffractive grating in the diffractive area may have a structure with a spatial frequency higher than 0 and equal to or less than 114 lines/mm, and a depth equal to or greater than 0.05 μm and equal to or smaller than 0.5 μm. In the following, the first embodiment of the optical structure will be described in detail with reference to FIGS. 1 to 5, and the second embodiment of the optical structure will be described in detail with reference to FIGS. 6 to 9.

First Embodiment of the Present Invention

Figure 2:
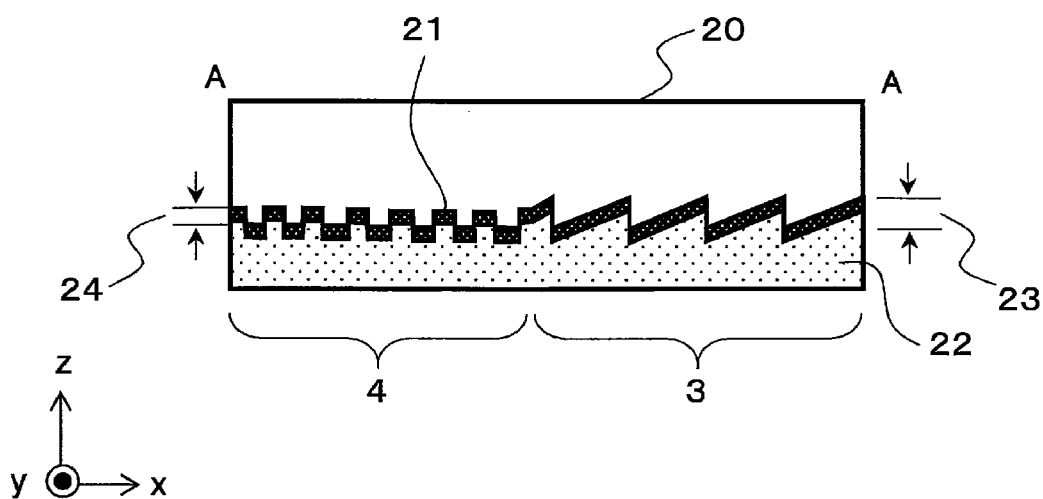
FIG. 2 is a schematic view of the cross-sectional structure taken along the line A-A of FIG. 1.

Referring to FIGS. 1 to 5, the first embodiment of an optical structure of the present invention will be described.
<Optical Structure>
FIG. 1 is a schematic plan view illustrating an example of the optical structure of the present invention. FIG. 2 is a cross-sectional view showing the cross-sectional structure of an example of the optical structure of the present invention. FIG. 2 shows the cross-sectional structure taken along the line A-A of FIG. 1.

As shown in FIG. 1, an optical structure 1 comprises an embossed recording body on one embossed face of the embossed layer. The area where the embossed recording body is formed may be a recording area 2. The recording area 2 includes a plurality of local structures 5 each including a local mirror structure 3 and a local diffractive structure 4. A local structure 5 can be composed of one local mirror structure 3 and one local diffractive structure 4. The local structure 5 is a pair of a local diffractive structure 4 and a local mirror structure 3 coupled to the local diffractive structure 4. The azimuth direction of the normal vector of the inclined mirrors of the local mirror structure 3 of the local structure 5 and the azimuth direction of the grating vector of the local diffractive structure 4 are similar. The azimuth direction of the normal vector of the inclined mirrors of the local mirror structure 3 is the same as the direction of the normal vector projected on the base plane that approximates the embossed face. The azimuth direction of the grating vector is the same as the direction of the grating vector projected on the base plane that approximates the embossed face. If the angle between the azimuth direction of the normal vector of the mirrors in the local mirror structure 3 of the local structure 5 and the azimuth direction of the grating vector of the local diffractive structure 4 is 10° or less, the azimuth direction of the normal vector of the mirrors and the azimuth direction of the grating vector can be regarded to be similar. Configuration of the local structure 5 makes it possible to form the embossed recording body.

The recording area 2 is the area where the embossed recording body is formed. The embossed recording body can record a pattern by configuration of the local structure 5. The pattern to be recorded can be a landmark, portrait, code, letter, number, sign, mark, symbol, motif, geometric pattern, or parallel line pattern. The recording area 2 includes one or more refractive mirror areas. In addition, the recording area 2 includes a plurality of diffractive areas. The diffractive areas are placed near the refractive mirror area(s). The gap between the diffractive areas and the refractive mirror area may be 0.1 µm or more and 100 µm or less. The gap between the diffractive areas and the refractive mirror area may be the distance between the closest points of the outer shapes of the respective areas. The refractive mirror area includes a plurality of local mirror structures 3. The diffractive area includes a plurality of local diffractive structures 4. A pair of a local mirror structure 3 and a local diffractive structure 4 forms one local structure 5. The embossed recording body includes a plurality of local structures 5. The recording area 2 has a plurality of local structures 5. The diffractive areas can be formed discretely in the recording area 2. Each of the diffractive areas formed discretely can be a local diffractive structure 4. Further, each of the diffractive areas formed discretely may have a plurality of local diffractive structures 4. The refractive mirror area can be formed discretely or continuously in the recording area 2. The mirror structure of the refractive mirror area adjacent to each local diffractive structure can be a local mirror structure coupled to the local diffractive structure.

As shown in FIG. 2, the optical structure 1 of the present invention can include an embossed layer 20, a light reflection layer 21, and an adhesive layer 22. The embossed layer 20 has an uneven structure on one of the two opposing faces of the embossed layer 20. The uneven structure forms the embossed recording body. In the embossed layer 20, the face including the recording area 2 is the embossed face. In other words, the face including the embossed recording body is the embossed face. One or both of the faces of the embossed layer 20 can be an embossed face(s). The embossed recording body is formed on a part or the entirety of the embossed face. The area where the embossed recording body is formed is the recording area 2. The embossed recording body is formed on a part or the entirety of the embossed face of the embossed layer 20.

The light reflecting layer 21 covers the embossed face of the embossed layer 20. In FIG. 2, the light reflecting layer 21 covers the entire embossed face, but it may instead cover a part of the embossed face. The adhesive layer 22 is attached to the light reflecting layer 21.

The optical structure 1 may not have the adhesive layer 22. The optical structure 1 may or may not have the adhesive layer 22. The presence/absence of the adhesive layer 22 can be determined according to the application of the optical structure 1. The optical structure 1 may include another functional layer different from the embossed layer 20, the light reflecting layer 21, and the adhesive layer 22. The embossed recording body of the embossed layer 20 includes a plurality of local structures 5 each having a local mirror structure 3 and a local diffractive structure 4. The functional layer can be an invisible functional layer or a visible functional layer. The functional layer can be overt, covert, or both. A covert one can be verified with a reader. An overt one can be verified with the naked eye or with a tool. The tool used for verification can be a loupe, black light, or a polarizing plate. The functional layer can be a variable ink printing, invisible ink printing, micro character printing, parallel line pattern printing, or liquid crystal layer. The invisible ink printing can be fluorescent ink printing, which is a printing formed with fluorescent ink, or infrared absorption ink printing which is a printing formed with infrared absorption ink. The liquid crystal layer can be a cholesteric liquid crystal layer or a nematic liquid crystal layer.

The optical structure 1 can display an image by configuration of the local structure 5 of the embossed recording body. The image of the optical structure 1 can be displayed by making visible light enter the optical structure 1. By making visible light enter the optical structure 1, an image of a pattern recorded on the embossed recording body is displayed. The image to be displayed can be a landmark, portrait, code, letter, number, sign, mark, symbol, motif, geometric pattern, or parallel line pattern. As shown in the drawing, in the configuration of the local structure 5, the local mirror structures 3 and the local diffraction structures 4 arranged along a first direction correspond to a first arrangement. The local mirror structures 3 and the local diffractive structures 4 arranged along a second direction orthogonal to the first direction correspond to a second arrangement. A first row and a second row may be different from each other. The first arrangement and the second arrangement may not be the same.

Next, each of the layers constituting the optical structure 1 will be described in more detail.

(Embossed Layer 20)

The embossed layer 20 may be optically transmissive. The embossed layer 20 may be transparent or translucent. The embossed layer 20 can be colored or colorless. The base material forming the embossed layer 20 can be a resin. The resin of the base material can be a thermoplastic resin or a thermosetting resin. The uncured resin of the base metal may be soluble. The solvent for dissolving the uncured resin of the base material can be a polar solvent, nonpolar solvent, or bipolar solvent. The solvent can also be a mixed solvent.

The base material forming the embossed layer 20 can be an acrylic resin, urethane resin, urethane acrylate resin, epoxy resin, olefin resin, or modified olefin resin. The olefin resin may be a polypropylene (PP) resin or a polyethylene (PE) resin. The modified olefin resin may be an acid-modified polypropylene (PP) resin or an acid-modified polyethylene (PE) resin. These materials can be easily processed and have flexibility. The finished product manufactured using these materials, that is, the optical structure 1 has good texture.

Further, the material for forming the embossed layer 20 may be a transparent resin. The transparent resin may be a polycarbonate resin or a methacrylstyrene (MS) resin. These resins can be relatively easily processed. These resins have a good impact resistance property. Therefore, the embossed layer 20 becomes unlikely to break. The transparent resin may be an acrylic resin or a polystyrene resin. By applying these resins to the embossed layer 20, an embossed layer 20 having good abrasion resistance can be obtained.

Further, the optical structure 1 may include a transparent protective layer on the face of the embossed layer 20 opposite to the embossed face. The transparent protective layer may be light transmissive. In this case, the transparent protective layer serves as a base of the embossed layer 20, and also serves to protect the embossed layer 20. Thus, the strength of the optical structure 1 can be increased. Further, since the strength of the optical structure 1 is increased by the transparent protective layer, the thickness of the embossed layer 20 can be reduced. The transparent protective layer can be a film, a coat layer, or a coated film.

The transparent protective layer may be formed of a light transmissive material. The light-transmitting material can be based on a homogeneous polymer or a composite. The composite can be a homogeneous composite of different polymers or a heterogeneous composite of different polymers. The composite of homogeneous polymers or different polymers may comprise one polymer of a continuous phase and another polymer of a dispersed phase. It is also possible that one polymer is a continuous phase and another polymer is also a continuous phase. The transparent protective layer may be polyethylene terephthalate (PET), polyethylene naphthalate (PEN), polycarbonate, acrylic, urethane, urethane acrylate, epoxy, fluoropolymer, silicone, or elastomer. The transparent protective layer may be hard. The transparent protective layer may have a cushioning property. The transparent protective layer may have heat resistance and chemical resistance properties. The light transmissive material may be cycloolefin (COP). Cycloolefin has little chromatic dispersion and birefringence, and excels in various optical properties. Further, the light transmissive material of the transparent protective layer may include powder. The powder can be inorganic powder or polymer powder. The inorganic powder can be silica particles or alumina particles. The polymer powder can be acrylic powder, silicone powder, fluorine powder, epoxy powder, urethane powder, urethane acrylate powder, or melamine powder.

(Light Reflecting Layer 21)

The light reflecting layer 21 is a layer that reflects light transmitted through the embossed layer 20. In the example shown in FIGS. 1 and 2, the light reflecting layer 21 covers the entire embossed face of the embossed layer 20. The light reflecting layer 21 may cover a part of the embossed face.

The light reflecting layer 21 covering a part of the embossed face may be a layer that covers only the bottom and top faces of the protruded portions of the embossed layer 20 and does not cover the side faces of the protruded portions. Alternatively, the light reflecting layer 21 covering a part of the embossed face may cover the embossed face so as to form an image pattern that is the same as or different from the image pattern configured by the local structures 5.

The light reflecting layer 21 can be a deposited layer or a coated layer. The deposited layer can be a metal layer, a silicon oxide layer, or a metal compound layer. The metal layer may be a layer formed by metal deposition. The silicon oxide layer can be a layer formed by depositing silicon oxide. The metal compound layer may be a layer formed by depositing a metal compound. The coated layer can be formed with high gloss ink. The metal layer may be aluminum, nickel, tin, zinc, silver, gold, or an alloy thereof. The high gloss ink may be an ink containing scale-like metal pieces. The metal compound layer may be a deposition layer of metal oxide, metal sulfide, metal nitride, or metal fluoride. The metal of the metal compound layer can be aluminum, titanium, zinc, sodium, calcium, or magnesium.

(Optional Layers)

The optical structure 1 may further include the adhesive layer 22 and other layers in addition to the embossed layer 20 and the light reflecting layer 21. The adhesive layer 22 is provided to impart an adhesive force to the optical structure 1 when the optical structure 1 is used being affixed to a card, paper, or the like. As described above, the adhesive layer 22 can be coated on the face of the light reflecting layer 21, which covers the embossed face of the embossed layer 20, that is opposite to the face in contact with the embossed layer 20. The material for forming the adhesive layer 22 may be a heat sensitive adhesive or a pressure sensitive adhesive.

The optical structure 1 may include, other than the embossed layer 20, the light reflecting layer 21, and the adhesive layer 22, a printing layer, a protective layer, or an intermediate layer. The optical structure 1 can be provided with various functional layers as appropriate depending on the application of the optical structure 1.

(Configuration of the Local Structures)

The configuration of the local structure 5 in the embossed recording body of the recording area 2 will be described with reference to FIGS. 1, 3, and 4.

The embossed layer 20 includes an embossed recording body on the embossed face. The embossed recording body has a refractive mirror structure and a diffractive structure. Each local structure 5 includes a local diffractive structure 4 having a diffractive structure and a local mirror structure 3 having a refractive mirror structure coupled with the local diffractive structure 4. The local structures 5 form the embossed recording body. The refractive mirror structure includes inclined mirrors. The refractive mirror structure may have a side face facing the inclined mirrors. Each inclined mirror can reflect the incident parallel light as parallel light. The inclined mirrors can be flat. Further, the inclined mirrors may also be slightly curved. The curvature radius of the inclined mirrors can be 100 mm or greater. Each inclined mirror may be a complete mirror surface, a light-transmissive mirror surface, or a rough mirror surface. The surface roughness Ra of the inclined mirrors can be 0.1 µm or greater and 1 µm or smaller. The diffractive structure is a structure including a diffraction grating. The diffractive structure diffracts light. The direction of the diffracted light with a single wavelength diffracted by the diffraction grating is one direction or a plurality of directions. The direction of the diffracted light with a single wavelength diffracted by the diffraction grating is determined by the direction of the diffraction grating vector and the direction of the light incident on the diffraction grating.

The diffracted light of the local diffractive structure 4 and the reflected light from the local mirror structure 3 adjacent to and coupled to the local diffractive structure 4 will be mixed. The mixed light cancels the chromatic dispersion of the diffracted light with the chromatic dispersion of the reflected light.

As shown in FIG. 1 referred to above, a plurality of local structures 5 are arranged in the recording area 2. In the plurality of local structures 5 arranged along the first direction, the local mirror structure 3 and the local diffractive structure 4 can be arranged in the same manner with respect to each in each local structure 5. In the example shown in FIG. 1, the first direction is the X direction. In the X direction, the local mirror structures 3 and the local diffraction structures 4 are alternately arranged. In a plane parallel to the flat face of the embossed layer 20, the direction orthogonal to the first direction is the second direction. In the example shown in FIG. 1, the second direction is the Y direction. In the plurality of local structures 5, the local structures 5 arranged along the X direction form one row. In the plurality of local structures 5, the local structures 5 arranged along the Y direction form one column. In two rows adjacent to each other in the Y direction, the positions of the local mirror structure 3 and the local diffraction structure 4 in each local structure 5 are different from each other.

That is, in the recording area 2, the first row and the second row are adjacent to each other in the Y direction. In the Y direction, the local mirror structure 3 included in the first row is adjacent to the local diffractive structure 4 included in the second row. Further, in the Y direction, the local diffractive structure 4 included in the first row is adjacent to the local mirror structure 3 included in the second row. Thus, a plurality of local structures 5 are arranged in the recording area 2, and the local mirror structures 3 and the local diffractive structures 4 are arranged in a checkered pattern in the recording area 2.

Here, in FIG. 1, each of the local mirror structures 3 and the local diffraction structures 4 is divided into a square shape by a contour line. However, the contour lines are merely drawn for convenience in order to clearly show the outer shape of each area. Therefore, in practice, the contour lines do not necessarily exist. The outer shapes of the structures 3 and 4 are not limited to the examples shown in FIG. 1. The outer shape of each structure 3 and 4 may be a polygon. The polygon may be a triangle, a quadrangle, a pentagon, or a hexagon. The quadrangle may be a rectangle, a parallelogram, a trapezoid, or a rhombus.

Figure 3:
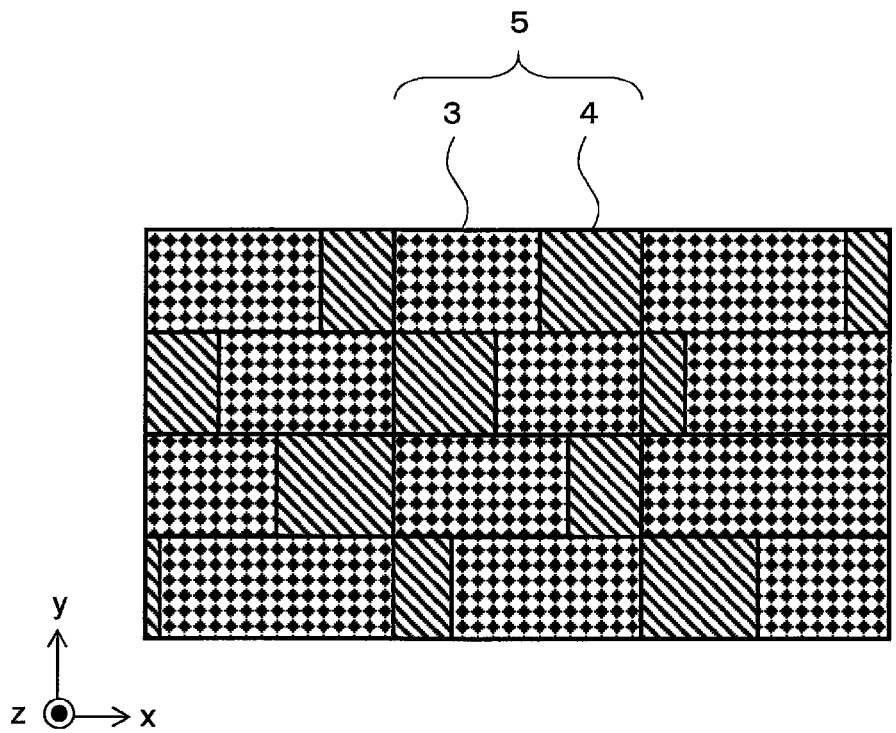
FIG. 3 is a plan view schematically showing the structure of an example of a recording area of the optical structure according to the present invention.

FIG. 3 shows an example in which the outer shape of each structure 3 and 4 is rectangular. FIG. 4 shows an example in which the outer shape of each structure 3 and 4 is a hexagon.

In the example shown in FIG. 3, the ratio of the area occupied by the local mirror structure 3 may differ for each local structure 5. Further, the ratio of the area occupied by the local diffractive structure 4 may differ for each local structure 5. The ratio of the area of the local mirror structure 3 and the area of the local diffractive structure 4 may be different for each local structure 5. The ratio of the local mirror structure 3 and the ratio of the local diffractive structure 4 in each local structure 5 may be set as appropriate according to the use of the optical structure 1 and the image to be displayed by the optical structure 1. In each local structure 5, the ratio of the area occupied by the local diffractive structure 4 can be 10% or more and 50% or less. In other words, the percentage of the area of the local diffraction structure 4 with respect to the area of the local structure 5 can be 10% or more and 50% or less.

Figure 4:
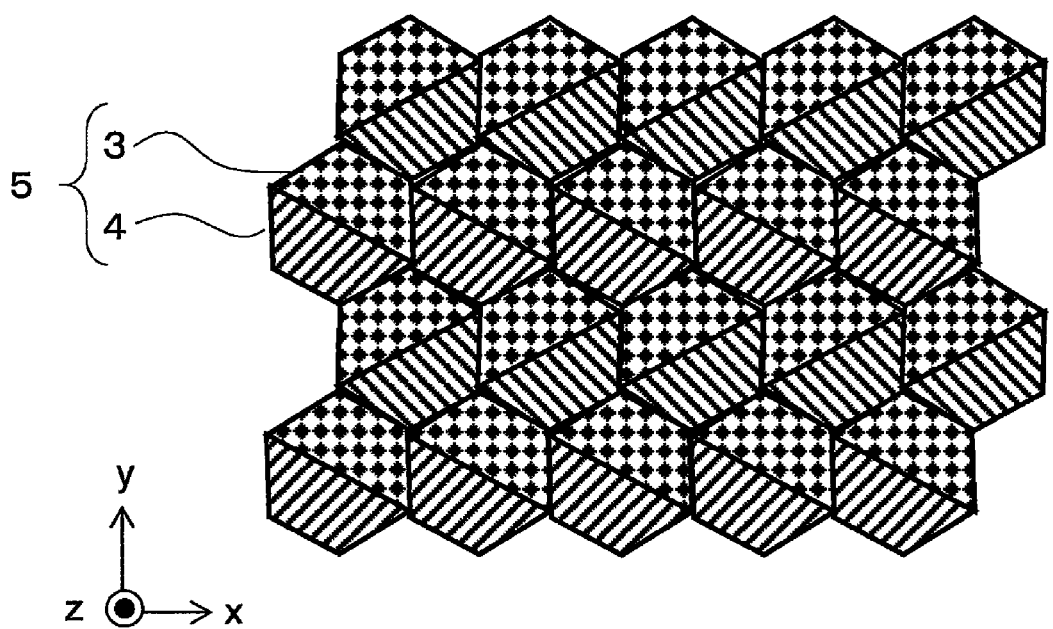
FIG. 4 is a plan view schematically showing the structure of another example of a recording area of the optical structure according to the present invention.

In the example shown in FIG. 4, the outer shape of the local structure 5 is a hexagonal shape. The local structure 5 is composed of the local mirror structure 3 and the local diffractive structure 4. In the local structure 5, the local mirror structure 3 and the local diffraction structure 4 divide the local structure 5 into halves. In the recording area 2, the local structures 5 are arranged in a honeycomb form. Each local mirror structure 3 and each local diffraction structure 4 may have a hexagonal shape. Then, the local mirror structures 3 and the local diffractive structures 4 may be alternately arranged in one or more directions and also arranged in a honeycomb form. Thus, the local mirror structures 3 and the local diffractive structures 4 can be appropriately arranged in accordance with the outer shape of the recording area 2.

The lengths of the long sides and the short sides of the local mirror structures 3 and the local diffraction structures 4 can be such that they cannot be easily identified by the naked eye. The long side and the short side may be 200 μm or less, and may be 40 μm or less. The long side and the short side can be defined as follows. First, of the line segments connecting two points on the outline of each structure, the line segment having the maximum length is defined as the long side. Next, a rectangle having a side parallel to the long side and circumscribing the outline of each structure is drawn. Then, the short side of the rectangle is defined as the short side of the outer shape of each structure.

As described above, the optical structure 1 comprises an embossed recording body on the embossed face of the embossed layer 20. The local mirror structures 3 and the local diffraction structures 4 included in the embossed recording body are alternately arranged, so that the optical structure 1 displays the desired characters, figures, symbols, or other marks.

(Recording Area 2)

With reference to FIG. 2, the embossed recording body of the recording area 2 will be described.

As shown in FIG. 2, the embossed layer 20 may include an embossed face and a flat face opposite to the embossed face. The zones of the embossed recording body on the embossed face of the embossed layer 20 in which the inclined mirrors are aligned are the local mirror structures 3. The local mirror structure 3 includes a plurality of microstructural inclined mirrors which are locally flat and inclined mirrors. Each inclined mirror is inclined at a certain angle with respect to a base plane that approximates the embossed face of the embossed layer 20. In addition, the normal vectors of the inclined mirrors of the local mirror structure 3 can have a fixed direction. Therefore, the local mirror structure 3 can be a unity of inclined mirrors with a fixed normal vector. In the local mirror structure 3, the inclined mirrors can be arranged in a regular manner. The inclined mirrors may be aligned at a regular pitch. In the local mirror structure 3, the inclined mirrors may be aligned at an equal pitch or may be aligned at an unequal pitch. However, if the pitch of the local mirror structure 3 is too small, light diffraction occurs in the local mirror structure 3. As a result, the likeliness of the observer recognizing unintended colors increases. Therefore, a pitch that is small enough to cause light diffraction is not suitable for the optical structure 1. The pitch at which the inclined mirrors are aligned can be 1 μm or more and 20 μm or less. The depth of the inclined mirrors, which is the maximum width of the inclined mirrors in the local mirror structure 3 in the thickness direction of the embossed layer, is a first depth 23. The first depth 23 can be 1 μm or more and 20 μm or less in order to prevent the diffraction in the local mirror structures 3 and in view of manufacturability. In the optical structure 1, the embossed recording body comprises such refractive mirror structures.

On the other hand, the local diffractive structures 4 have a diffractive structure. One local diffractive structure 4 can be one of discrete diffractive areas. The one local diffractive structure 4 has a certain grating vector in the local diffraction structure 4. The local diffractive structure 4 is adjacent to the local mirror structure 3. In the above-described embodiment, the local diffractive structure 4 is adjacent to the local mirror structure 3 and constitutes the local structure 5 as a pair with the local mirror structure 3. The local diffractive structure 4 corrects the color shift generated in the local mirror structure 3. In other words, the local diffractive structure 4 compensates for the chromatic dispersion of the local mirror structure 3. The grating vector of the diffractive structure can be determined based on the refractive index and chromatic dispersion of the embossed layer 20, the transparent protective layer, and the like, as well as the refraction angle of the mirrors in the local mirror structure 3, and the like. In addition, the grating vector of the diffractive structure can be parallel to the base plane that approximates the embossed face. The grating vector of the diffractive structure can instead be non-parallel to the base plane that approximates the embossed face. If the grating vector of the diffractive structure is not parallel to the base plane that approximates the embossed face, it has an inclination angle which is the angle between the base plane and the grating vector. The difference between the exit angle of the light beam having a first wavelength and the exit angle of the light beam having a second wavelength different from the first wavelength can be set by the spatial frequency and the inclination angle of the grating vector. Further, when the diffractive structure has a groove-like form, the grating vector has one direction. When the diffractive structure is a crossed grating, there will be a plurality of discrete grating vectors. If one of the grating vectors has an azimuth direction that is similar to the azimuth direction of the inclined mirrors, the local mirror structure can be coupled with the local diffractive structure. Note that the depth of the diffractive grating is a second depth 24. The second depth 24 may be 0.05 μm or more and 0.5 μm or less considering, for example, the diffraction efficiency of the diffractive grating.

(Reduction of Color Shift)

Next, the reason why the color shift is canceled in the optical structure 1, in other words, why the chromatic dispersion is compensated will be described. First, it is assumed that the light source is located in an oblique direction with respect to the optical structure 1, and the observer observes the optical structure 1 from the front of the optical structure 1, in other words, in such a direction that the observer faces the embossed face of the embossed layer 20.

As shown in FIG. 5, incident light 30 obliquely enters the optical structure 1, in other words, the flat face of the embossed layer 20. The incident light beam is refracted at the interface between the air and the flat face of the embossed layer 20, that is, the incident surface. Then, the light beam reaches the inclined mirrors of the local mirror structures 3 that form a pattern in the optical structure 1. At this time, since the refractive index of the light beams incident on the optical structure 1 is different depending on the wavelength of light, the angle of refraction is also different depending on the wavelength. Therefore, chromatic dispersion occurs in the local mirror structures 3.

The light beams of the incident light 30 refracted at different angles depending on the wavelength are reflected by the inclined mirrors in the local mirror structure 3 and then reach the observer's eyes. At this time, only a part of the light beams may be recognized by the observer because the position where the light beams reach differs from the position of the eyes of the observer. Thus, the observer perceives that the image displayed by the local mirror structures 3 is colored. In other words, the observer recognizes that the local mirror structures 3 have a specific color. According to the optical structure 1 of the present embodiment, a diffractive grating having chromatic dispersion in the opposite direction to the chromatic dispersion caused by refraction is placed in the vicinity of the local mirror structure 3. In other words, the order of the chromatic dispersion of the diffracted light of the local diffractive structure 4 and the order of the chromatic dispersion of the reflected light refracted by the local mirror structure 3 are opposite with respect to the symmetry axis, which is the normal vector with respect to the flat face. This makes it possible to cancel the color shift of the local mirror structure 3 by the light emerged from the local diffractive structure 4. As a result, according to the optical structure 1, the coloring phenomenon of the local mirror structure 3 can be reduced.

In order to explain more specifically, chromatic dispersion due to refraction in the case where white light enters the optical structure 1 from an angle of 45° with respect to the normal vector of the flat face of the embossed layer 20 will be described below. The incident light 30 is assumed to be white light, and the light beams of specific colors included in the white light are set as, for instance, an F-line (wavelength: 486.133 nm) as a blue light beam and a C-line (wavelength: 656.273 nm) as a red light beam. Further, in this instance, a cycloolefin resin (ZEONEX E48R, manufactured by Zeon Corporation) (ZEONEX is a registered trademark) is used as the material of the embossed layer 20. Note that, when the optical structure 1 includes a transparent protective layer, the material of the transparent protective layer can be the same as the material of the embossed layer 20.

The refractive index for the F-line is defined as a first refractive index $n_F$, and the refractive index for the C-line is defined as a second refractive index $n_C$. When the above-described cycloolefin resin (ZEONEX E48R) is used, the first refractive index $n_F$ which is the refractive index for the F-line is 1.5378, and the second refractive index $n_C$ which is the refractive index for the C-line is 1.5283. As in this case, when cycloolefin resin (ZEONEX E48R) is used, the refractive index of blue light (F-line) is higher than the refractive index of red light (C-line). That is, the property of cycloolefin resin (ZEONEX E48R) to refract blue light is stronger than its property to refract red light.

Note that the angle described below is an angle with respect to the normal vector of the incident surface, that is, an angle between the normal vector of the incident surface and the light beam. The light beam incident at an angle of 45° with respect to the normal vector of the incident surface is refracted at the incident surface. The blue light beam (F-line) propagates through the cycloolefin resin at an angle of 27.38°. The red light beam (C-line) propagates through the cycloolefin resin at an angle of 27.56°. These light beams reach the inclined mirrors. By setting the angle of the inclined mirrors of the embossed layer 20 to 27.47°, the reflected light 31 including the light beams can be reflected towards the front of the observer, in other words, in the direction in which the observer and the flat face are facing each other. Considering the refraction of each light beam when exiting from the incident surface, the blue light beam (F-line) is finally emerged at an angle of 0.14°, and the red light beam (C-line) is finally emerged at an angle of −0.14°. That is, the blue light beam and the red light beam can be emerged in a state where the angular difference between the blue light beam and the red light beam is 0.28°.

The difference between the angle of the blue light beam and the angle of the red light beam causes a shift of about 1.48 mm between the blue light beam and the red light beam when the observation distance is set to 30 cm. Therefore, when a wavelength is selected depending on the relationship of the position of the eyes of the observer, the position of the blue light beam, and the position of the red light beam, color is perceived. In order to cancel out the color shift due to refraction, a diffraction grating is placed in a small area that cannot be visually identified. Note that the observation distance is a distance between the observer's eyes and the flat face of the embossed layer 20.

With regard to the diffraction grating, when the spatial frequency of the diffraction grating is 74.41 lines/mm and white light enters the optical structure 1 under the above-described conditions, the angular difference of the blue light beam (F-line) and the red light beam (C line) of the primary diffracted light will be 0.28°. In this case, the grating interval of the diffraction grating is 13.44 µm. By installing the diffraction grating at an angle of 24.8° with respect to the flat face of the embossed layer 20, in other words, by setting the inclination angle to 24.8°, the primary diffracted light (diffracted light 32) can be emerged in the same direction as the light reflected by the local mirror structure 3. As a result, since the blue light beam reflected by the refractive mirror structure and the red light beam diffracted by the diffraction grating are emerged in the same direction, the color shift can be reduced, in other words, the chromatic dispersion of the local mirror structures 3 can be compensated.

By setting the length of the long side of the local diffractive structure 4 to 40 µm or less, each of the structures 3 and 4 can have a size that is equal to or smaller than the resolution by the naked eye. Further, the arrangement interval of the local diffractive structures 4 may be 40 µm or less. In the paired local mirror structure 3 and local diffractive structure 4, the reflected light of the local mirror structure 3 and the diffracted light of the local diffractive structure 4 are perceived by the observer as light beams emerged together from the same point.

There may be a case where the incident angle is larger, for example, 85°. In this case, the inclination angle of the inclined mirrors is 40.53°, the exit angle of the blue light beam (F-line) is 0.23°, and the exit angle of the red light beam (C-line) is −0.23°. The spatial frequency of the corresponding diffraction grating is 113.30 lines/mm, and the grating interval is 8.83 µm. The plane of the diffraction grating is tilted by 35.8°, in other words, the inclination angle is set to 35.8°. This makes it possible to cancel the color shift by the primary diffracted light of the diffraction grating. In other words, the chromatic dispersion of the reflected light refracted by the refractive mirror structure can be compensated by the primary diffracted light of the diffraction grating.

There may also be a case where the incident angle is smaller, for example, 10°. In this case, the inclination angle of the inclined mirrors is 6.50°, the exit angle of the blue light beam (F-line) is 0.03°, and the exit angle of the red light beam (C-line) is −0.03°. The spatial frequency of the corresponding diffraction grating is 17.29 lines/mm, and the grating interval is 57.84 µm. The plane of the diffraction grating is tilted by 5.9°, in other words, the inclination angle is set to 5.9°. This makes it possible to cancel the color shift by the primary diffracted light of the diffraction grating. In other words, the chromatic dispersion of the reflected light refracted by the refractive mirror structure can be compensated by the primary diffracted light of the diffraction grating.

However, as in the above case where the incident angle is smaller, when the incident light is incident on the flat face of the embossed layer 20 from the front, the refraction at the incident surface hardly occurs. Thus, the color shift caused by the refractive mirror structure is small. In other words, the chromatic dispersion of the reflected light refracted by the refractive mirror structure is small. In practice, the range of the incident angle is 0° or more and 90° or less. By setting the spatial frequency and inclination angle of the diffraction grating according to the incident angle, the color of the reflected light refracted by the refraction mirror structure can be canceled by the diffracted light.

(Method of Manufacturing the Optical Structure of the Present Invention)

Description is now given of a method of producing the optical structure 1 of the present invention.

The material for forming the embossed layer 20, that is, polypropylene (PP), polyethylene (PE), or the like can be used to form the embossed layer 20 by extrusion or the like. Specifically, molten resin is brought into contact with the surface of a cooling roll having a desired uneven shape, and the uneven shape on the surface is transferred to the molten resin. After that, the molten resin is cured by cooling it. The embossed layer 20 can thus be formed. The uneven shape formed on the surface of the cooling roll can be a male mold or a female mold having the shape of the embossed face. That is, the uneven shape formed on the surface of the cooling roll can be determined by the embossed shape recorded on the embossed recording body. In other words, the uneven shape formed on the surface of the cooling roll can be determined in accordance with the shape of the inclined mirrors included in the local mirror structures 3, the alignment state, the shape of the diffractive structure included in the local diffractive structures 4, and the configuration of the local structures.

Further, when the optical structure 1 includes a transparent protective layer as a base of the embossed layer 20, for instance, a thermosetting resin or a photocurable resin is applied onto a carrier formed of polyethylene terephthalate (PET). Then, a metal stamper on which the desired uneven shape is formed is put into close contact with the applied resin layer. When a thermosetting resin is used, the resin layer is heated in a state where the stamper is in close contact with the resin layer. On the other hand, when a photocurable resin is used, the resin layer is irradiated with light in a state where the stamper is in close contact with the resin layer. Then, after the resin is cured, the stamper is peeled off from the cured resin layer, and finally the embossed layer 20 is formed.

An instance of the method of forming a metal stamper is to form an embossed recording body directly on a metal surface constituting the surface of the stamper. The method of directly forming the embossed recording body on the metal surface may be a method of forming the embossed recording body by scraping the metal stamper surface with a cutting tool. Alternatively, the method of directly forming the embossed recording body on the metal surface may be a method of selectively etching the metal surface by an exposure process using a photosensitive material. Alternatively, the method of directly forming the embossed recording body on the metal surface may be a method of processing the metal surface using ablation by laser light or the like.

An instance of a method of manufacturing a metal stamper having a finer uneven shape can be as follows.

When manufacturing the stamper, first, using a stepper device, an electron beam drawing device, or the like, a desired pattern is drawn on a photoresist layer having a uniform thickness formed by applying a photoresist. The photoresist layer is then developed. Thus, an original plate can be obtained. A metal stamper can be obtained by obtaining a metal layer to which the original plate is transferred by a method such as electroforming. The uneven shape formed on the metal stamper can be determined as appropriate based on the predetermined optical distance or the like selected for displaying a desired image and correcting the color shift of the inclined mirrors. In other words, the uneven shape formed on the surface of the stamper can be determined in accordance with the shape of the inclined mirrors included in the local mirror structures 3, and the shape of the diffractive structure included in the local diffractive structures 4.

Next, the light reflecting layer 21 is formed on the embossed layer 20 by depositing a single layer or a plurality of layers. The method of forming the light reflecting layer 21 may be vapor deposition or silver mirror treatment. The vapor deposition method may be evaporation or sputtering. The material for forming the light reflecting layer 21 may be a metal or a dielectric. The metal may be aluminum. Note that the light reflecting layer 21 covering only a part of the embossed face, that is, the patterned light reflecting layer 21 can be formed by the following method. For instance, first, a continuous film, in other words, a continuous film covering the entire embossed face is formed by vapor deposition. Then, the patterned light reflecting layer 21 can be obtained by dissolving a part of the continuous film with a chemical or the like to thereby remove a part of the continuous film from the embossed face.

The optical structure 1 can be formed in the above manner. As a result, it is possible to provide an optical structure 1 capable of suppressing color shift at the inclined mirrors and having stable color development.

Second Embodiment of the Present Invention

With reference to FIGS. 6 to 9, the second embodiment of an optical structure of the present invention will be described. The second embodiment differs from the first embodiment in the relationship between the area where the inclined mirrors are placed and the area where the diffraction grating is placed. Thus, the second embodiment will be described focusing on such differences, omitting specific explanation of the components common to the first embodiment by designating the same reference signs thereto as those of the first embodiment.

In the optical structure according to the second embodiment, the diffraction area is a discrete diffractive area among a plurality of diffractive areas. The plurality of discrete diffractive areas are dispersed in the recording area. The refractive mirror area includes the area between the diffractive areas. With reference to FIG. 6, the optical structure according to the second embodiment will be described below in more detail.

FIG. 6 shows an optical structure 1 having a recording area 2. The recording area 2 is composed of one refractive mirror area 41 and a plurality of diffractive areas 42. The refractive mirror area 41 includes the refractive mirror structure described above, and the diffractive area 42 includes the diffractive structure described above. In the example of FIG. 6, the outline of each diffractive area 42 is circular in plan view as viewed from a direction facing the recording area 2. The diffractive areas 42 have the same size. The outline of the refractive mirror area 41 is the outline of the recording area 2.

The diffractive areas 42 are arranged at equal intervals along the X direction and are arranged at equal intervals along the Y direction. The interval of the diffractive areas 42 in the X direction is equal to the interval of the diffractive areas 42 in the Y direction. Further, the diffractive areas 42 are arranged at equal intervals along a first arrangement direction D1, and are also arranged at equal intervals along a second arrangement direction D2 orthogonal to the first arrangement direction D1. The first arrangement direction D1 is a direction that intersects the X direction at an angle of 45°.

The refractive mirror area 41 can fill the gaps between the diffractive areas 42 in the recording area 2. In other words, in the recording area 2, the diffractive areas 42 can be surrounded by the refractive mirror area 41. The diffraction areas 42 are discretely arranged, and the refractive mirror area 41 can be continuous. In other words, the refractive mirror area 41 and the diffractive areas 42 can form a sea-island structure in the recording area 2 where the refractive mirror area 41 is the sea and the diffractive areas 42 are the islands. Each diffractive area 42 is adjacent to a part of the refractive mirror area 41. The local diffractive structure of each diffractive area 42 is paired with a local mirror structure to which it is adjacent and coupled. The pair of a local diffractive structure and a local mirror structure coupled to the local diffractive structure forms a local structure.

Next, the local mirror structure included in the refractive mirror area 41 and the local diffractive structure included in the diffractive area 42 will be described in more detail with reference to FIGS. 7A and 7B. FIG. 7A shows an example of the local mirror structure included in the refractive mirror area 41 and the local diffractive structure included in the diffractive area 42. FIG. 7B shows another example of the local mirror structure included in the refractive mirror area 41 and the local diffractive structure included in the diffractive area 42. Note that FIGS. 7A and 7B show an enlarged area B, which is an area surrounded by the two-dot chain line in FIG. 6. Further, FIGS. 7A and 7B illustrate a case where the outer shape of the diffractive area 42 is elliptical.

As shown in FIG. 7A, the refractive mirror area 41 includes the local mirror structure 3, and the diffractive area 42 includes the local diffractive structure 4. In a plan view facing the embossed face, the size of the local mirror structure 3 and the size of the local diffractive structure 4 may be equal to each other. In the local mirror structure 3, the direction in which the normal of an inclined mirror projected onto the base plane approximate to the embossed face extends is the azimuth direction Vm of the mirror normal vector. The azimuth direction Vm of the mirror normal vector can be constant throughout the refractive mirror area 41. In the local diffraction structure 4, the direction orthogonal to the direction in which the grooves forming the diffraction grating extend is the azimuth direction of the grating vector. The azimuth direction Vg of the diffraction grating vector can be constant throughout the diffractive area 42. The azimuth direction Vm of the mirror normal vector and the azimuth direction Vg of the diffraction grating vector are substantially parallel. The local mirror structure 3 and the local diffractive structure 4 are separated.

As shown in FIG. 7B, as with the example shown in FIG. 7A, the refractive mirror area 41 includes the local mirror structure 3, and the diffractive area 42 includes the local diffractive structure 4. In a plan view facing the embossed face, the size of the local mirror structure 3 and the size of the local diffractive structure 4 may be equal to each other. In the example shown in FIG. 7B, the azimuth direction Vg of the diffraction grating vector in the local diffraction structure 4 is different from the azimuth direction Vg of the diffraction grating vector in the region of the diffractive area 42 above (as viewed in the drawing) the local diffraction structure 4. Thus, the local diffractive structure 4 occupies ½ or smaller area within the diffractive area 42. The inclined mirrors included in the refractive mirror area 41 are bent in the middle as they extend from right to left as seen in the drawing. Therefore, in the refractive mirror area 41, the azimuth direction Vm of the mirror normal vector in the region on the right side of the bent part of the inclined mirrors and the azimuth direction Vm of the mirror normal vector in the region on the left side are different from each other.

The coupling between the local diffractive structure 4 and the local mirror structure 3 can be defined substantially optically. If the azimuth direction of the normal vector of the mirror of the local mirror structure 3 and the azimuth direction of the grating vector of the local diffraction structure 4 are similar, the local mirror structure 3 can be substantially optically coupled to the local diffraction structure 4. If the angle formed by the azimuth direction of the normal vector of the mirror of the local mirror structure 3 and the azimuth direction of the grating vector of the local diffraction structure 4 is 10° or less, the azimuth directions can be regarded as being similar. The pair of a local diffractive structure 4 and the local mirror structure 3 coupled to the local diffractive structure 4 can be regarded as a local structure 5. Further, the diffraction grating of the local diffraction structure 4 to be coupled can have a spatial frequency higher than 0 and equal to or lower than 114 lines/mm. The coupling between the local diffraction structure 4 and the local mirror structure 3 does not need to be uniquely determined.

The local diffractive structure 4 and the local mirror structure 3 coupled to the local diffractive structure 4 can have similar sizes. The outer shape of the local diffractive structure 4 can be circular. The diameter of the local diffraction structure 4 may be about 10 μm or more and 200 μm or less. The outer shape of the local mirror structure 3 can be circular. The diameter of the local mirror structure 3 may be about 10 μm or more and 100 μm or less. The distance between the center of the local diffractive structure 4 and the center of the local mirror structure 3 coupled to the local diffractive structure 4 can be 10 μm or more and 100 μm or less. The local mirror structure 3 and the local diffractive structure 4 are adjacent to each other. In other words, the distance between the centers of the local mirror structure 3 and the local diffraction structure 4 is 10 μm or more and 100 μm or less.

In the recording area 2, the area of the refractive mirror area 41 is larger than the sum of the areas of the diffraction areas 42. In other words, if the area of the refractive mirror area 41 is set to 1, the sum of the areas of the diffraction areas 42 is smaller than 1. The ratio of the area of the refractive mirror area 41 and the total area of the diffractive areas 42 can be changed as appropriate by changing the size of each diffractive area 42.

The larger the area of a certain diffraction area 42, the higher the intensity of the light beam emerged from that diffraction area 42. In other words, the smaller the area of a certain diffraction area 42, the lower the intensity of light beam emerged from that diffraction area 42. Therefore, the degree of compensation for chromatic dispersion in the refractive mirror area 41 can be adjusted by the area of each diffraction area 42. That is, if the area of the diffraction areas 42 is smaller than the area for completely compensating for the chromatic dispersion in the refractive mirror area 41, only a part of the chromatic dispersion in the refractive mirror area 41 is compensated for by the diffracted light emerged from the diffraction areas 42. Thus, by changing the ratio of the total area of the diffraction areas 42 to the area of the refractive mirror area 41, the color exhibited by the recording area 2 can be changed.

First Modification of the Present Invention

Figure 8:
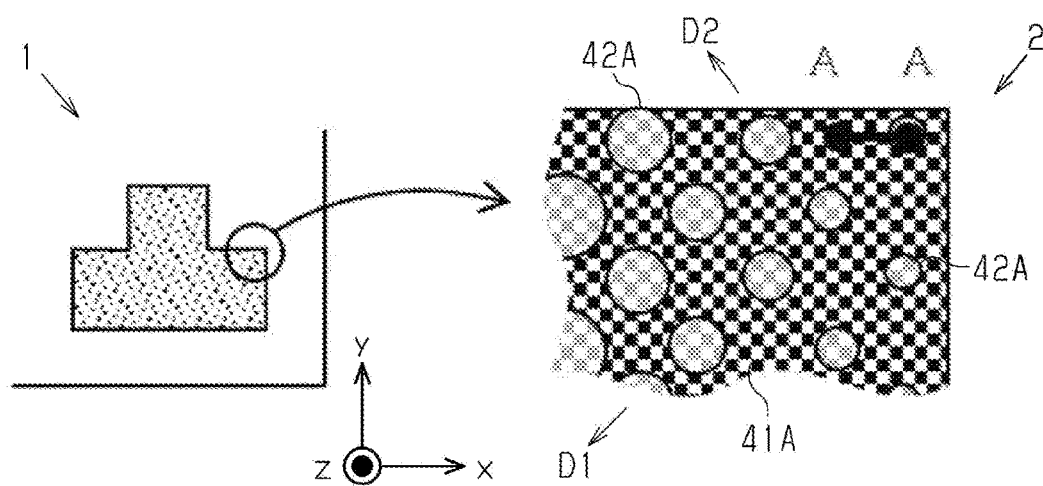
FIG. 8 is a plan view schematically illustrating the structure of an example of an optical structure according to a first modification of the second embodiment of the present invention as viewed from the front.

In the first modification of the second embodiment of the present invention, the smaller the distance between a diffraction area and the outline of the refractive mirror area, the smaller the area of that diffraction area. With reference to FIG. 8, the first modification will be described below in more detail.

As shown in FIG. 8, the recording area 2 includes a continuous refractive mirror area 41A and a plurality of discrete diffraction areas 42A. In the first modification, the recording area 2 can include discrete diffraction areas 42A having different areas. This modification differs from the above-described optical structure 1 of the second embodiment in this regard. In other words, in the first modification, the sizes of the diffraction areas 42 can be different. That is, the recording area 2 includes diffraction areas 42 having different sizes.

More specifically, diffraction areas 42A arranged along the first arrangement direction D1 constitute one first row. The recording area 2 includes a plurality of first rows arranged in the second arrangement direction D2 orthogonal to the first arrangement direction D1. In each of the first rows, the smaller the distance of a diffraction area 42A from the outline of the recording area 2, in other words, the outline of the refractive mirror area 41A, the smaller the area of the diffraction area 42A.

The diffraction areas 42A arranged along the second arrangement direction D2 constitute one second row. In other words, each diffraction area 42A is located on a first row in which a plurality of diffraction areas 42A are arranged along the first arrangement direction D1, and a second row in which a plurality of diffraction areas 42A are arranged in the second arrangement direction D2. The recording area 2 includes a plurality of second rows arranged along the first arrangement direction D1. In each of the second rows, the area of the diffraction area 42A gradually increases along the direction from a first end toward a second end. In the example shown in FIGS. 7A and 7B, in each second row, the end located below as viewed in the drawing is the first end, and the end located above the first end as viewed in the drawing is the second end.

In the first modification, the area of the diffraction area 42A differs depending on the position where the diffraction area 42A is located in the recording area 2. Therefore, the recording area 2 includes zones having different degrees of compensation of chromatic dispersion in the refractive mirror area 41A provided by the diffracted light emerged from the diffraction areas 42A.

In addition, in the first modification, in each first row extending along the first arrangement direction D1, the smaller the distance of the diffraction area 42A from the recording area 2 (that is, as it approaches the upper left of the drawing), the smaller the area of the diffraction area 42A. Therefore, in the first row, the smaller the distance from the outline of the recording area 2, the smaller the degree of compensation of chromatic dispersion in the refractive mirror area 41A, and the larger the distance from the outline of the recording area 2, the larger the degree of compensation of chromatic dispersion in the refractive mirror area 41A. Therefore, in the first row, since the degree of compensation of chromatic dispersion gradually varies along the first arrangement direction D1, the color exhibited by the refractive mirror area 41A can be gradually varied along the first arrangement direction D1.

In each second row extending along the second arrangement direction D2, the area of the diffraction area 42A increases from the bottom to the top as viewed in the drawing. Therefore, in the second row, the degree of compensation of chromatic dispersion in the refractive mirror area 41A decreases as it approaches the bottom of the page, and the degree of compensation of chromatic dispersion in the refractive mirror area 41A increases as it approaches the top of the page. Therefore, in the second row, since the degree of compensation of chromatic dispersion gradually varies along the direction from the bottom to the top of the page, the color exhibited by the refractive mirror area 41A can be gradually varied.

Second Modification of the Present Invention

Figure 9:
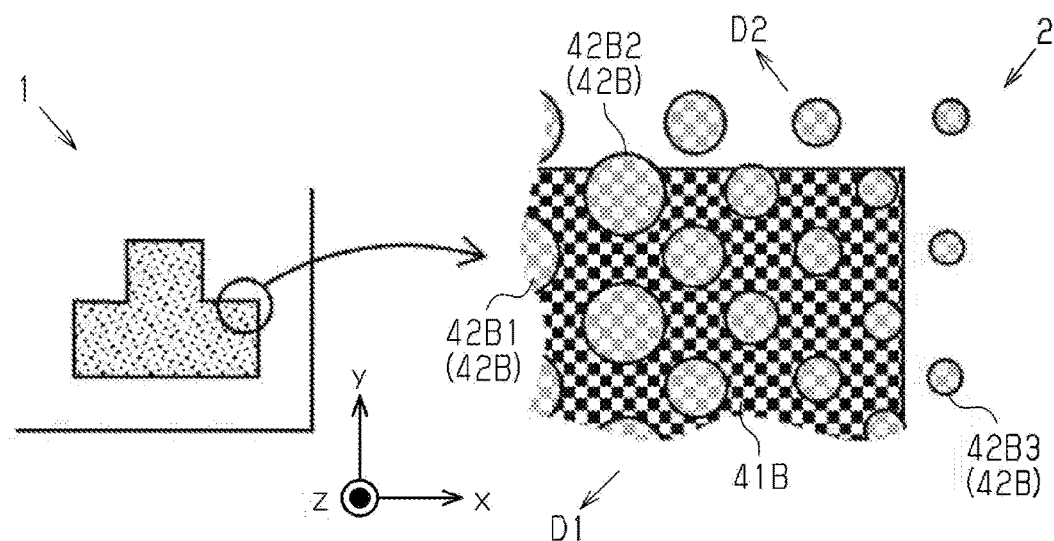
FIG. 9 is a plan view schematically illustrating the structure of an example of an optical structure according to a second modification of the second embodiment of the present invention as viewed from the front.

In the second modification of the second embodiment of the present invention, the embossed surface further includes a plurality of diffraction regions located outside the refractive mirror area and along the outline of the refractive mirror area. With reference to FIG. 9, the second modification will be described below in more detail.

As shown in FIG. 9, the diffraction areas 42B comprises a first diffraction area 42B1, a second diffraction area 42B2, and a third diffraction area 42B3. The first diffraction area 42B1 is a diffraction area 42B whose entire circumference is surrounded by the refractive mirror area 41B. The second diffraction area 42B2 is a diffraction area 42B whose circumference is partially surrounded by the refractive mirror area 41B. The third diffraction area 42B3 is a diffraction area 42B that is not surrounded by the refractive mirror area 41B.

In the second modification, the recording area 2 is constituted by the zone of the refractive mirror area 41B, the first diffraction areas 42B1, and the portions of the second diffraction areas 42B2 that do not protrude from the refractive mirror area 41B. That is, the third diffraction area 42B3 is a diffraction area 42B located outside the recording area 2.

Each first row extending along the first arrangement direction D1 includes at least two third diffraction areas 42B3 and a first diffraction area 42B1 sandwiched between the two third diffraction areas 42B3. The first rows include a first row including a second diffraction area 42B2 in addition to the third diffraction areas 42B3 and the first diffraction area 42B1. The first row including the second diffraction area 42B2 may include only one second diffraction area 42B2 or may include two second diffraction areas 42B2. When the first row includes two second diffraction areas 42B2, the first diffraction areas 42B1 are sandwiched between the two second diffraction areas 42B2. The third diffraction areas 42B3 are located at intervals along the along the refractive mirror area 41B.

Further, each second row extending along the second arrangement direction D2 includes at least two third diffraction areas 42B3 and a first diffraction area 42B1 sandwiched between the two third diffraction areas 42B3. The second rows include a second row including a second diffraction area 42B2 in addition to the third diffraction areas 42B3 and the first diffraction area 42B1. The second row including the second diffraction area 42B2 may include only one second diffraction area 42B2 or may include two second diffraction areas 42B2. When the second row includes two second diffraction areas 42B2, the first diffraction areas 42B1 are sandwiched between the two second diffraction areas 42B2.

In each first row, the smaller the distance from the outline of the recording area 2, the smaller the area of the first diffraction area 42B1. When the first row includes a second diffraction area 42B2, the area of the second diffraction area 42B2 is smaller than the area of the first diffraction area 42B1 adjacent to the second diffraction area 42B2, and larger than the area of the third diffraction area 42B3 adjacent to the second diffraction area 42B2.

In each of the second rows, the area of the diffraction area 42B gradually increases along the direction from a first end toward a second end. In the example shown in FIG. 8, in each second row, the end located closer to the bottom of the page is the first end, and the end located closer to the top of the page than the first end is located is the second end.

In the second modification, in the recording area 2, it is possible to obtain the effects of the first modification described above. In addition, in the second modification, the third diffraction areas 42B3 are located outside the recording area 2. Since the third diffraction areas 42B3 are not surrounded by the refractive mirror area 41B, the light emerged from the third diffraction areas 42B3 cannot serve as light that compensates for chromatic dispersion in the refractive mirror area 41B. In other words, the light emerged from the third diffraction areas 42B3 is not canceled by the light emerged from the refractive mirror area 41B. Therefore, in the second modification, iridescent light originating from the third diffraction areas 42B3 is emerged along the outline of the recording area 2 outside the recording area 2. In other words, outside the recording area 2, light originating from the third diffraction areas 42B3 along the outline of the recording area 2 and having a plurality of specific colors dispersed to different wavelengths is emerged.

Note that each first row and each second row may include only one third diffraction area 42B3. In addition, in the second modification, the areas of all the diffraction areas 42B may be the same.

Other Modifications of the Present Invention

The second embodiment of the present invention may be modified as follows.

Figure 10A:
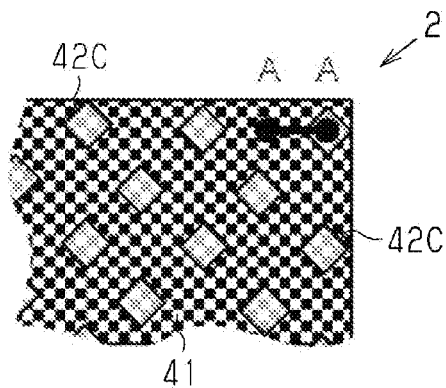
FIGS. 10A, 10B, 10C, and 10D are plan views schematically illustrating the structures of examples of optical structures according to other modifications of the second embodiment of the present invention as viewed from the front.
Figure 10B:
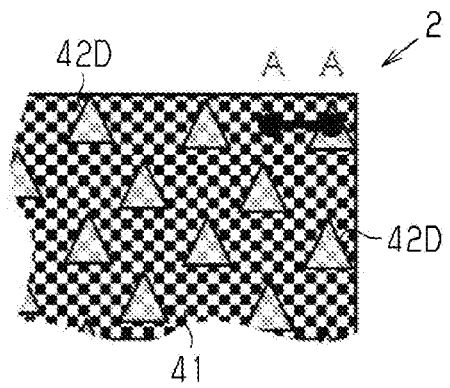
Figure 10C:
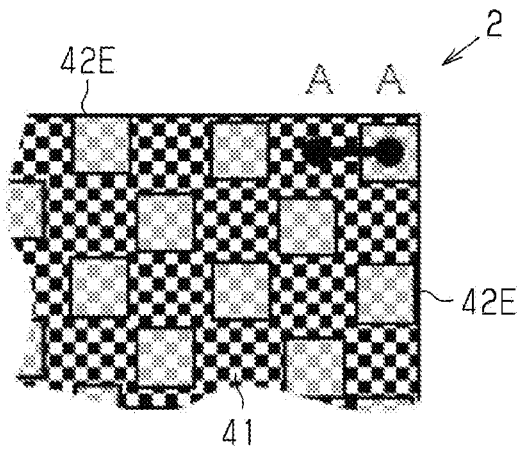
Figure 10D:
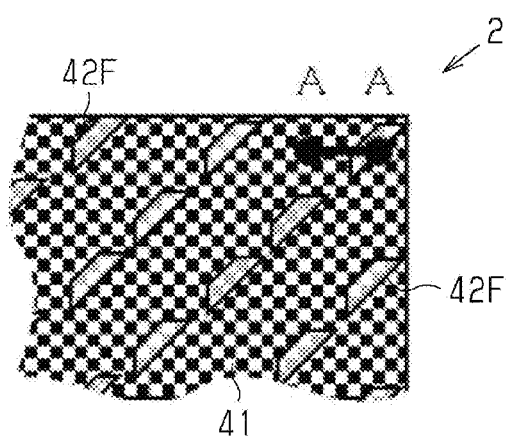

The outline of each discrete diffraction area may not be circular. That is, as shown in FIG. 10A, the outline of the discrete diffraction areas 42C may be a rhombus. Although the internal angles of the rhombus are 90° in the example shown in FIG. 10A, the internal angles of the rhombus may not be 90°. As shown in FIG. 10B, the outline of the discrete diffraction areas 42D may be a triangle. As shown in FIG. 10C, the outline of the discrete diffraction areas 42E may be a square. As shown in FIG. 10D, the outline of the discrete diffraction areas 42F may be a trapezoid. Alternatively, the outline of the diffraction areas may be a parallelogram. The shapes of the outlines of the discrete diffraction areas 42A may be different. Moreover, even if the shapes of the outlines of the discrete diffraction areas 42A are the same, the orientation of the shapes, for example, the orientation of the apex may be different. In the example of FIG. 9, the sizes of the discrete diffraction areas are varied, but the arrangement intervals of the discrete diffraction areas may be varied.

The four examples shown in FIGS. 10A, 10B, 10C, and 10D can be combined with the configuration of the first modification described above, or combined with the configuration of the second modification described above.

REFERENCE SIGNS LIST

1 . . . Optical structure; 2 . . . Recording area; 3 . . . Local mirror structure; 4 . . . Local diffraction structure; 5 . . . Local structure; 20 . . . Embossed layer; 21 . . . Light reflecting layer; 22 . . . Adhesive layer; 23 . . . First depth; 24 . . . Second depth; 30 . . . Incident light; 31 . . . Reflected light; 32 . . . Diffracted light; 41, 41A, 41B . . . Refractive mirror area; 42, 42A, 42B, 42C, 42D, 42E, 42F . . . Diffractive area; 42B1 . . . First diffractive area; 42B2 . . . Second diffractive area; 42B3 . . . Third diffractive area.

What is claimed is:

1. An optical structure, comprising:
an embossed layer having an embossed face including a recording area, the recording area including an embossed recording body having an uneven structure; and
a light reflecting layer covering the recording area, wherein
the recording area includes a plurality of local structures each including a local refractive mirror structure and a local diffractive structure adjacent to the local refractive mirror structure,
each local refractive mirror structure of each local structure of said plurality of local structures includes a plurality of aligned inclined mirrors constituting the embossed recording body, the inclined mirrors of said plurality of inclined mirrors are aligned so each inclined mirror of the plurality of inclined mirrors has an identical non-zero inclination angle with respect to a base plane that approximates an embossed face of the embossed layer;
an azimuth direction of an orthogonal vector of the inclined mirror in the local mirror structure area and an azimuth direction of a grating vector of the corresponding local diffractive structure differ by 10° or less for each local structure of said plurality of local structures,
diffracted light of the local diffractive structure is mixed with reflected light of the corresponding local mirror structure for each local structure of said plurality of local structures.

2. The optical structure of claim 1, wherein a distance between centers of the local mirror structure and the local diffraction structure is 10 µm or more and 100 µm or less.

3. The optical structure of claim 1, wherein
each inclined mirror of the local mirror structure has a depth of 1 µm or more, and
the diffractive structure has a spatial frequency that is higher than 0 and equal to or lower than 114 lines/mm and a depth of 0.5 µm or less.

4. The optical structure of claim 1, wherein the plurality of local structures are arranged in the recording area so that local mirror structures and local diffractive structures of the plurality of local structures are arranged in a checkered pattern.

5. The optical structure of claim 1, wherein a percentage of an area of the local diffractive structure with respect to an area of the respective local structure is 50% or less.

6. The optical structure of claim 1, wherein inclined mirrors of said plurality of inclined mirrors are at a pitch of 1 µm or more and 20 µm or less.

7. The optical structure of claim 1, wherein a maximum dimension in a thickness direction of the embossed layer of each inclined mirror of said plurality of inclined mirrors is 1 µm or more and 20 µm or less.

* * * * *